United States Patent
Kranich

(10) Patent No.: US 7,689,809 B2
(45) Date of Patent: Mar. 30, 2010

(54) TRANSPARENT RETURN TO PARALLEL MODE BY RAMPOLINE INSTRUCTION SUBSEQUENT TO INTERRUPT PROCESSING TO ACCOMMODATE SLAVE PROCESSOR NOT SUPPORTED BY OPERATING SYSTEM

(75) Inventor: Uwe Kranich, Kirchheim (DE)

(73) Assignee: Advanced Micro Devices, Inc., Austin, TX (US)

( * ) Notice: Subject to any disclaimer, the term of this patent is extended or adjusted under 35 U.S.C. 154(b) by 84 days.

(21) Appl. No.: 12/014,868

(22) Filed: Jan. 16, 2008

(65) Prior Publication Data

US 2008/0301408 A1     Dec. 4, 2008

(30) Foreign Application Priority Data

May 31, 2007     (DE) ...................... 10 2007 025 397

(51) Int. Cl.
*G06F 15/16*     (2006.01)
(52) U.S. Cl. .............................. 712/31; 712/34; 712/244
(58) Field of Classification Search ....................... None
See application file for complete search history.

(56) References Cited

U.S. PATENT DOCUMENTS

| | | | | |
|---|---|---|---|---|
| 5,197,138 A | | 3/1993 | Hobbs et al. ................. | 395/375 |
| 5,812,823 A | | 9/1998 | Kahle et al. ................. | 395/500 |
| 6,003,129 A | * | 12/1999 | Song et al. .................. | 712/244 |

(Continued)

OTHER PUBLICATIONS

PCT Search Report from PCT/US2008/006744 dated Nov. 7, 2008.

*Primary Examiner*—Kenneth S Kim
(74) *Attorney, Agent, or Firm*—Williams, Morgan & Amerson, P.C.

(57) ABSTRACT

A system comprises a master processor and at least one slave processor. A state of the master processor comprises a first plurality of variables and a state of the slave processor comprises a second plurality of variables. The system comprises a parallel mode of operation wherein data are processed by the master processor and the slave processor and a serial mode of operation wherein data are processed by the master processor. In case of an interrupt or exception occurring in the parallel mode of operation, the system performs the steps of saving at least a portion of the first plurality of variables and the second plurality of variables to a buffer memory and switching the system to the serial mode of operation. If the interrupt or exception is occurring in the slave processor, at least one of the first plurality of variables is set to a value of at least one of the second plurality of variables. A system includes a master processor having a first state, a slave processor having a second state, and a buffer memory. The system is operable to switch from a parallel mode to a serial mode responsive to an interrupt or exception and save the states to the buffer memory. Responsive to the interrupt or exception occurring in the slave processor, the system sets at least one variable in the first state to that of a variable in the second state. Responsive to the interrupt or exception occurring in the master processor, the system saves a first return address from the first state and the second state to the buffer memory and replaces the first return address with an address of a trampoline instruction. The trampoline instruction switches the system to the parallel mode of operation and reads the second state and the first return address from the buffer memory.

22 Claims, 4 Drawing Sheets

U.S. PATENT DOCUMENTS

| | | | |
|---|---|---|---|
| 6,230,259 B1 | 5/2001 | Christie et al. | 712/228 |
| 6,651,163 B1 | 11/2003 | Kranich et al. | 712/244 |
| 6,711,643 B2 * | 3/2004 | Park et al. | 710/260 |
| 2005/0060577 A1 * | 3/2005 | Barrett et al. | 713/201 |
| 2007/0067533 A1 | 3/2007 | So et al. | 710/260 |

* cited by examiner

TRANSPARENT RETURN TO PARALLEL MODE BY RAMPOLINE INSTRUCTION SUBSEQUENT TO INTERRUPT PROCESSING TO ACCOMMODATE SLAVE PROCESSOR NOT SUPPORTED BY OPERATING SYSTEM

BACKGROUND OF THE INVENTION

1. Field of the Invention

The present disclosure generally relates to the field of computer systems, and, in particular, to systems comprising a plurality of processors.

2. Description of the Related Art

In modern computer systems, processors are employed which comprise a plurality of instructions. The processor reads instructions and data from a system memory connected to the processor, and modifies the instructions and/or data in accordance with the instructions. The system memory may comprise volatile, but quickly accessible, memory devices, such as RAMs, as well as slow, but permanent, memory devices, such as hard disks. Moreover, the computer may receive input from devices such as a keyboard, a mouse and/or a network connection, and may provide output to devices such as, e.g., a monitor, one or more loud-speakers and/or a printer. In most computer systems, a specialized computer program, which is denoted as the "operating system," is employed to control the processing of various programs as well as the transfer of data between the components of the computer system.

FIG. 1a shows a schematic block diagram of a computer system 100 according to the state of the art. The computer system 100 comprises a processor 101, a system memory 104 and one or more input/output devices 103. Arrows 102 schematically indicate the transfer of data between the processor 101, the system memory 104 and the input/output device(s) 103.

The processor 101 comprises a plurality of registers 102, 103, 104, 105. Data may be read from the system memory 104 into the registers 102-105, and data in the registers 102-105 may be written to the system memory 104. The processor 101 may comprise instructions adapted to modify the contents of the registers 102-105, as well as instructions to transfer data between the registers 102-105 and the system memory 104 and/or between the registers 102-105. Moreover, instructions which perform a combination of such tasks may be provided. Typically, the processor 101 may access data in the registers 102-105 much faster than data stored in the system memory 104.

In order to improve the performance of the computer system 100, it may be desirable to provide a plurality of processors, instead of one single processor 101. Thus, a plurality of tasks and/or threads may be executed simultaneously. This may help increase the speed of operation of the computer system 100.

In computer systems according to the state of the art, however, an increase of the number of processors may require a modification of the operating system, as will be explained in the following with reference to FIG. 1b. FIG. 1b shows a schematic flow diagram of a task 201 running on the processor 101 in the computer system 100 according to the state of the art. The task 201 comprises a plurality of instructions 210-215 which are to be processed sequentially by the processor 101. Hence, the processor 101 proceeds from instruction 210 to instruction 211, and from instruction 211 to instruction 212.

While the task 201 is processed, for example, during or after the processing of instruction 212, an interrupt or exception may occur, which is indicated schematically by arrow 230 in FIG. 1b. An exception may be generated in case of an error during the processing of instruction 212, for example, in case of a division by zero or in case of an error message from the system memory 104, such as a page fault. Exceptions may also be generated regularly by instructions of the task 201, for example, by instruction 212. A typical application of an exception generated by the task 201 is a call of the operating system of the computer system 100. Interrupts may be generated by events originating from devices other than the processor 101, for example, by input into the input/output device 103, or by a synchronization request of the input/output device 103. If multitasking is performed in the computer system 100, interrupts generated by a timing circuit may be employed to alternately activate the various tasks, which may be processes or threads.

In case of an interrupt or exception, the execution of the task 201 may be interrupted and an interrupt routine 202, which may, for example, be part of the operating system, is executed. The interrupt routine 202 comprises a plurality of instructions 220-225. These instructions are processed sequentially. After processing the last instruction 225 of the interrupt routine 202, processing of the task 201 is continued at the instruction following the instruction 212 at which the interrupt occurred, i.e., in the above example, at instruction 213.

The interrupt routine 202 may modify the content of the registers 102-105 of the processor 101. In order to insure that the task 201 will function properly in spite of the interrupt or exception, after the occurrence of the interrupt or exception, the content of the registers 102-105 is copied to a storage location in the system memory 104. Before the execution of the task 201 is continued, the content of the storage location is read back into the registers 102-105. Thus, when the execution of the task 201 is continued by executing the instruction 213, the registers 102-105 may comprise substantially the same data as if the instruction 213 would have been executed immediately after instruction 212.

In computer systems 100 according to the state of the art, copying of the content of the register to the storage location and back is effected by instructions provided in the interrupt routine 202, which are implemented as part of the operating system of the computer system 100. Hence, in case additional processors are provided in the computer system 100, modifications of the operating system may be required to insure that, in the event of an interrupt or exception occurring in any of the processors, the content of the registers of the processors is correctly stored in the system memory and read back into the registers after the completion of the interrupt routine.

Further modifications of the operating system may be required in order to schedule the execution of processes and tasks in the individual processors. In computer systems according to the state of the art, the control of the execution of the processes and/or threads in the processors and the distribution of programs and/or threads to the processors is performed by the operating system. In addition to requiring an adaptation of the operating system to the presence of a plurality of processors, the control of the execution of processes and/or thread may require a relatively large overhead for the creation and/or control of processes and/or threads. In particular, a considerable overhead may be created by copying the contents of registers of the processors to a storage location before an operating system routine is called, and reading the content of the storage location back into the registers after the termination of the operating system routine.

A problem of the computer system 100 according to the state of the art is that additional processors provided in the computer system 100 may not reasonably be used until manufacturers of operating systems implement support for the additional processors or any other possible devices.

A further problem of the computer system 100 according to the state of the art is that a relatively large overhead for the creation and/or control of processes and/or threads by means of the operating system may reduce the performance of the computer system 100, in particular, if relatively fine grain multitasking and/or multithreading is used.

Furthermore, even in computer systems according to the state of the art providing support for multiple processors, it may be desirable to hide additional processors or features from the operating system. This also might include additional hardware and/or processors which are not known to the operating system. Hence, a further problem of computer systems according to the state of the art is that it may be hard to use additional resources such as processors or hardware which are not visible to the operating system.

The present disclosure is directed to various systems and methods that may avoid, or at least reduce, the effects of one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

According to one illustrative example, a system comprises a master processor and at least one slave processor. A state of the master processor comprises a first plurality of variables and a state of the slave processor comprises a second plurality of variables. The system comprises a parallel mode of operation wherein data are processed by the master processor and the slave processor, and a serial mode of operation wherein data are processed by the master processor. The system is configured to perform, in case of an interrupt or exception occurring in the parallel mode of operation, the steps of saving at least a portion of the first plurality of variables and the second plurality of variables to a buffer memory and switching the system to the serial mode of operation. The system is further configured to set at least one of the first plurality of variables to a value of at least one of the second plurality of variables in case the interrupt or exception is occurring in the slave processor.

According to another illustrative example, a system comprises a master processor and at least one slave processor. A state of the master processor comprises a first plurality of variables comprising a first return address, and a state of the slave processor comprises a second plurality of variables comprising a second return address. The system comprises a parallel mode of operation wherein data are processed by the master processor and the slave processor, and a serial mode of operation wherein data are processed by the master processor. The system comprises a trampoline instruction. The system is configured to perform, in case of an interrupt or exception occurring in the master processor during the parallel mode of operation, the steps of saving the first return address and the second plurality of variables to a buffer memory, replacing the first return address with an address of the trampoline instruction and switching to the serial mode of operation. The system is further configured to perform, in case of an interrupt or exception occurring in the slave processor during the parallel mode of operation, the steps of saving the first plurality of variables and the second plurality of variables to a buffer memory, setting at least one of the first plurality of variables to a value of at least one of the second variables, replacing the first return address with an address of the trampoline instruction and switching to the first mode of operation. The trampoline instruction is adapted to perform the steps of switching the system to the parallel mode of operation and reading the second plurality of variables and the first return address from the buffer memory if the interrupt or exception occurred in the master processor. The trampoline instruction is further adapted to perform the steps of switching the system to the parallel mode of operation, reading the second plurality of variables from the buffer memory, setting the at least one of the second plurality of variables to a value of the at least one of the first plurality of variables and reading the first plurality of variables from the buffer memory if the interrupt or exception occurred in the at least one slave processor.

According to a further illustrative example, a method of operating a system comprising a master processor and at least one slave processor, a state of the master processor comprising a first plurality of variables and a state of the slave processor comprising a second plurality of variables, the system comprising a parallel mode of operation wherein data are processed by the master processor and the slave processor and a serial mode of operation wherein data are processed by the slave processor comprises the following features. In case of an interrupt or exception occurring in the parallel mode of operation, the steps of saving at least a portion of the first plurality of variables and the second plurality of variables to a buffer memory and switching the system to the serial mode of operation are performed. If the interrupt or exception is occurring in the at least one slave processor, at least one of the first plurality of variables is set to a value of at least one of the second plurality of variables.

BRIEF DESCRIPTION OF THE DRAWINGS

The disclosure may be understood by reference to the following description taken in conjunction with the accompanying drawings, in which like reference numerals identify like elements, and in which.

Figure 1A:
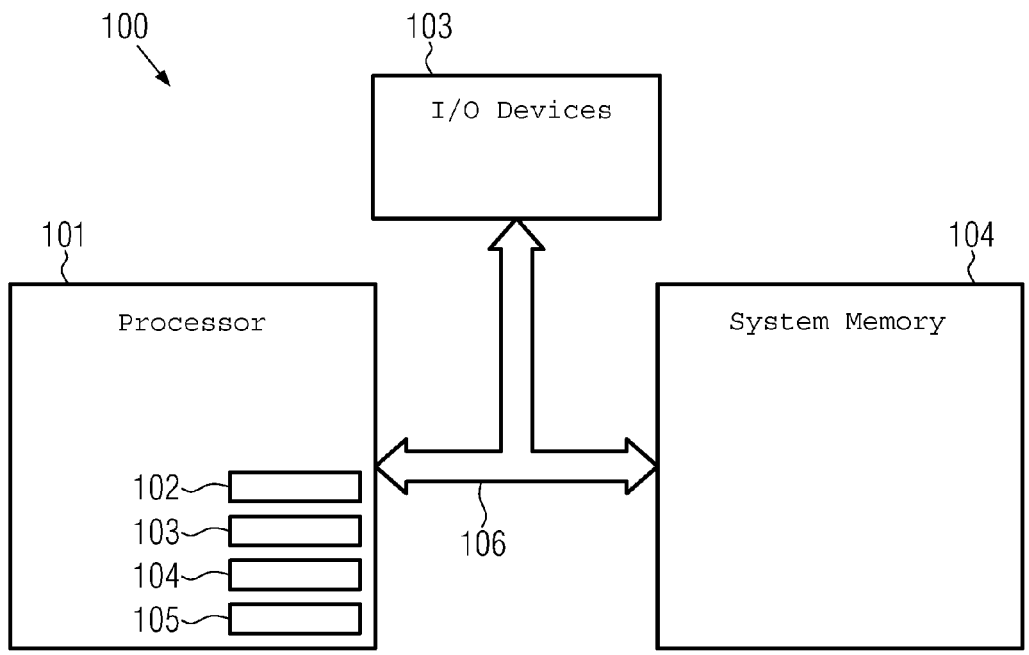
FIG. 1*a* shows a schematic drawing of a computer system according to the state of the art.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

According to one illustrative embodiment, a computer system comprising a master processor and at least one slave processor is provided. While, in some embodiments, the computer system may comprise a single slave processor, in other embodiments, a plurality of slave processors may be provided. The computer system comprises a parallel mode of operation wherein data are processed both by the master processor and the at least one slave processor. In embodiments wherein the computer system comprises a plurality of slave processors, each of the slave processors, or only a part of the slave processors, may simultaneously execute instructions in the parallel mode of operation. Hence, in the parallel mode of operation, a plurality of tasks may be executed simultaneously on the master processor and the slave processors in order to improve the performance of the computer system. The serial mode of operation may, in some embodiments, be a compatibility mode wherein the computer system provides the functionality of a predecessor model having only a single processor.

A state of the master processor comprises a plurality of variables which may be representative of contents of registers of the master processors. Similarly, a state of each of the slave processors may comprise a plurality of variables which may be representative of contents of registers of the slave processor and/or a running status bit indicating whether the slave processor is currently executing instructions. Both in the master processor and in the slave processors, one of the plurality of variables of the respective processor may comprise a return address at which the processor continues the instruction execution in the absence of an interrupt or exception. For example, the return address may be provided in one of the registers of the respective processors.

The computer system may comprise a variable sending instruction adapted to write values of one or more of the plurality of variables of the master processor to one or more of the plurality of variables of one of the slave processors. Thus, parameters of a slave processor may be set up before the execution of a thread by the slave processor is started. Instruction execution at each of the slave processors may be initiated by means of a fork instruction which may receive an identification number of the slave processor where instruction execution is to be started and a target address at which the instruction execution is to be started as arguments. The execution of threads at the slave processors may be stopped by means of a slave join instruction. If a slave join instruction occurs in a sequence of instructions executed by the slave processor, the slave processor will stop the execution of instructions. A master join instruction may be used for synchronization between the master processor and one of the slave processors. The master join instruction is called with the identification number of a slave processor as argument. If the master join instruction occurs in a sequence of instructions executed by the master processor, the master processor will wait until the execution of instructions in the slave processor specified in the argument of the master join instruction has terminated. The computer system further comprises a variable receiving instruction adapted to write values of one or more of the plurality of variables of one of the slave processors to one or more of the plurality of variables of the master processor. The variable receiving instruction may be used in order to receive result values or a pointer to a memory buffer comprising results of the execution of a task in the slave processor.

Hence, in the computer system, processes and/or threads may be executed in the master processor and in the slave processors in a parallel manner. Using the instructions described above, the execution of tasks in one or more of the slave processors may be started and stopped independently of an operating system running on the computer system.

The computer system may be configured to save, in case of an interrupt or exception occurring in the parallel mode of operation, at least a portion of the variables representative of the state of the master processor and the slave processors to a buffer memory and to switch the system to the serial mode of operation. In particular, the variables of the slave processor and variables of the master processor such as contents of registers which are not present in a predecessor model of the computer system may be saved. Thus, the operating system need not be adapted to save the variables of the slave processor and variables of the master processor which are not used in a computer system comprising a single processor. Hence, compatibility of the computer system with a predecessor model comprising a single processor may be provided, and an operating system adapted to the predecessor model may be used for the computer system.

In case the interrupt or exception has occurred in a slave processor, at least one of the plurality of variables of the master processor may be set to a value of at least one of the plurality of variables of the slave processor in which the interrupt or exception occurred. Thus, variables of the slave processor may be communicated to the operating system, which may read data relevant for an interrupt routine carried out by the operating system from the master processor.

The computer system may further comprise a trampoline instruction. The trampoline instruction may be adapted to read those variables of the slave processors and, optionally, of the master processor which were stored upon the interrupt or exception from the buffer memory. Additionally, the trampoline instruction may be adapted to switch the computer system from the serial mode of operation to the parallel mode of operation. In case the interrupt or exception has occurred in a slave processor, the trampoline instruction can write those variables of the master processor which were set to values of variables of a slave processor when the interrupt or exception occurred to the variables of the slave processor. This can be done before reading the original variables of the master processor from the buffer memory.

In case of an interrupt or exception, the return address of the master processor may be replaced by an address of the trampoline instruction. Thus, the trampoline instruction is called automatically after the termination of the interrupt routine. Hence, the variables of the slave processor and/or the master processor which are not present in a computer system comprising a single processor may be handled independently of the operating system. This allows use of the parallel mode of operation of the computer system in a manner transparent to the operating system. Hence, substantially no adaptations of the operating system are required in order to allow use of the parallel mode of operation of the computer system.

Figure 2A:
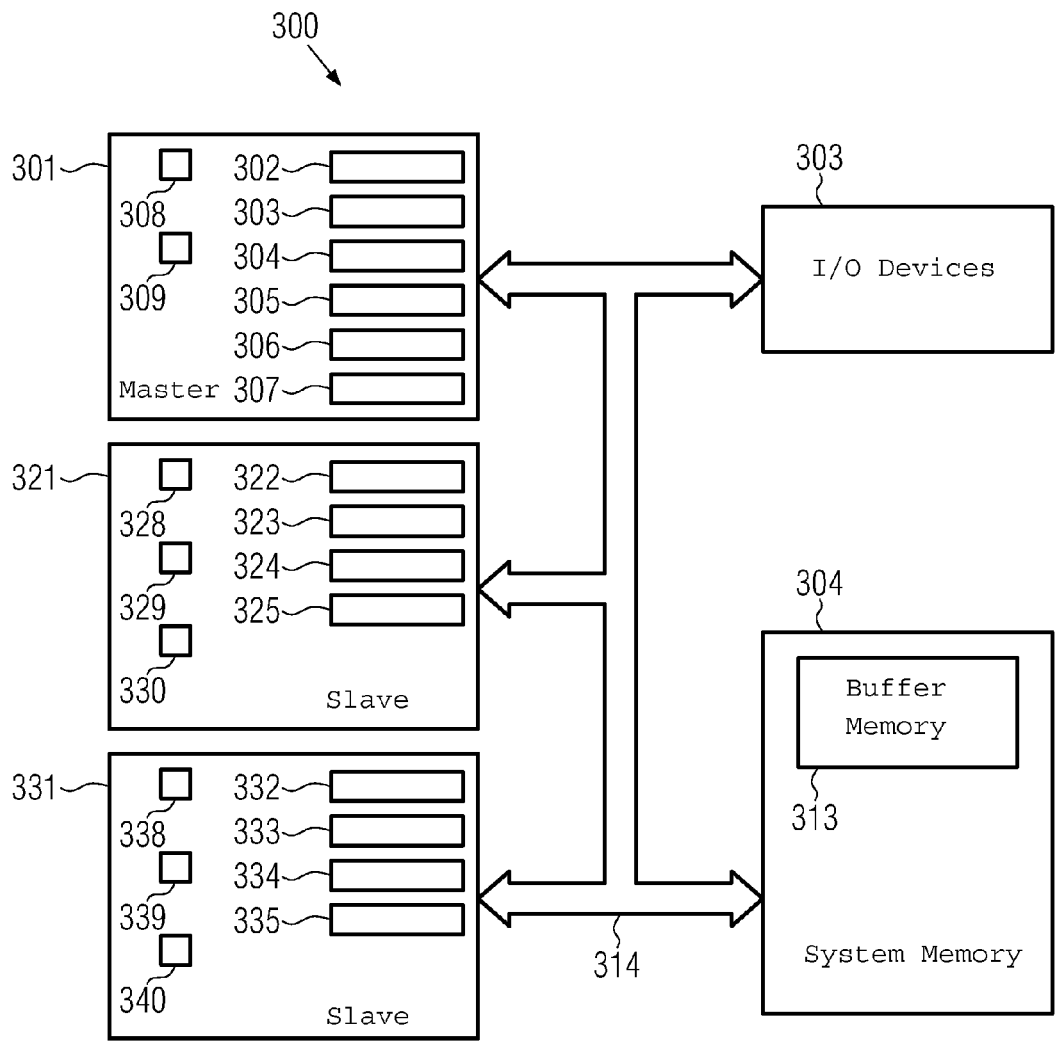
FIG. 2*a* shows a schematic drawing of a computer system according to an illustrative embodiment disclosed herein.

FIG. 2a shows a schematic drawing of a computer system 300 according to one illustrative embodiment. The computer system 300 comprises a master processor 301 and slave processors 321, 331. The present invention, however, is not restricted to embodiments wherein two slave processors are provided, as shown in FIG. 2a. In other embodiments, three or more slave processors may be provided. In still further embodiments, the computer system 300 may comprise a single slave processor. Moreover, the present invention is not restricted to embodiments wherein the slave processors 321, 331 are general purpose processors. In other embodiments, the slave processors 321, 331 may comprise special function hardware.

The computer system 300 may further comprise a system memory 304 and input/output devices 303. Arrows 314 schematically indicate the transfer of data between the master processor 301, the slave processors 321, 331, the system memory 304 and the input/output devices 303.

Figure 1B:
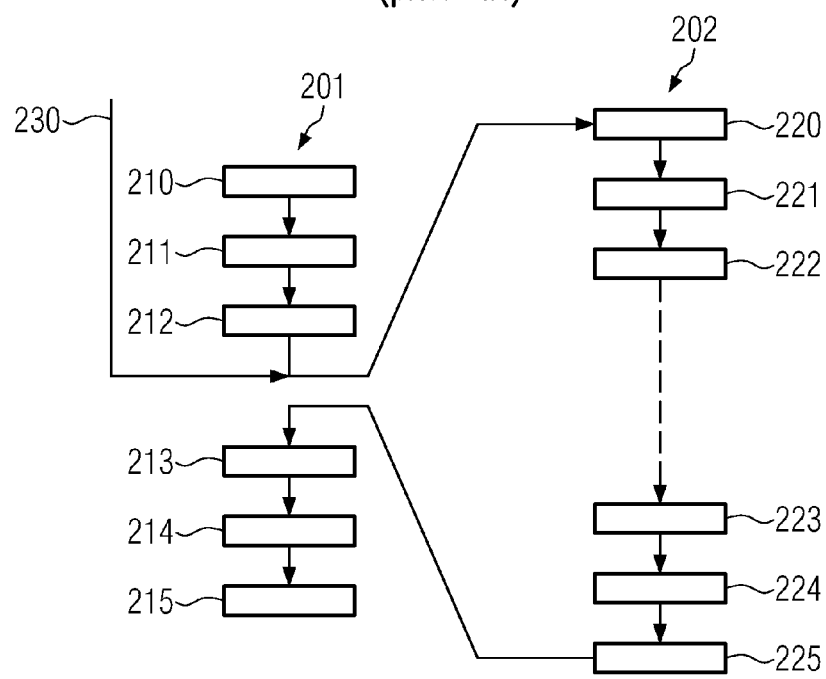
FIG. 1*b* shows a schematic flow diagram of a program and an interrupt routine running on a computer system according to the state of the art.

The master processor 301 comprises a plurality of registers 302-307. In some embodiments, the plurality of registers 302-307 may comprise a first subset which may, for example, comprise the registers 302-305 and a second subset which may comprise the registers 306, 307. The registers 302-305 of the first subset may correspond to registers of a processor in a computer system according to the state of the art, for example, to the registers 102-105 of the processor 101 in the computer system 100 described above with reference to FIGS. 1a-1b. The master processor 301 may further be configured to provide, in a serial mode of operation of the computer system 300, a set of instructions comprising the set of instructions of the processor 101 according to the state of the art. Thus, in the serial mode of operation, the computer system 300 may execute binary code provided for the computer system 100 according to the state of the art.

The registers 306, 307 of the second subset may be used to handle a transfer of data associated with parallel processing of data in the master processor 301 and the slave processors 321, 331, as will be explained in more detail below.

Similar to the master processor 301, the first slave processor 321 may comprise a plurality of registers 322-325 and the second slave processor 331 may comprise a plurality of registers 332-335. In some embodiments, the registers 322-325, 332-335 of the slave processors 321, 331 may correspond to the first subset 302-305 of the registers of the master processor 301. In each of the registers 302-307, 322-325 and 332-335, variables representative of the state of the master processor 302, the first slave processor 321 and the second slave processor 331 may be stored.

In some embodiments, each of the master processor 301 and the slave processors 321, 331 may be adapted to provide the functionality of a processor of the type x86 or x86-64 which is well known to persons skilled in the art. In other embodiments, each of the master processor 301 and the slave processors 321, 331 may be configured to provide the functionality of a processor of a different type. In still further embodiments, the master processor 301 may be adapted to provide the functionality of a different type of processor than the slave processors 321, 331.

In one embodiment, the master processor 301 may be adapted to provide the functionality of a processor type supported by an existing operating system, for example, the functionality of an x86 or x86-64 processor, and the slave processors 321, 331 may be processors of a different type which need not be supported by the operating system. For example, the slave processors 321, 331 may comprise a simplified architecture to minimize an area on a die occupied by the slave processors 321, 331. This may help increase the number of slave processors 321, 331 of the computer system 300 to enhance the performance of the computer system 300. Additionally, a simplified architecture of the slave processors 321, 331 may allow an increased clock rate of the slave processors 321, 331 to increase the speed of operation of each individual slave processor.

In some embodiments, the master processor 301 and one or more of the slave processors 321, 331 may be provided on a single die. In other embodiments, the master processor 301 and the slave processors 321, 331 may be provided on different dies.

The master processor 301 may comprise an indicator bit 308 and a control register bit 309. The indicator bit 308 may be a non-architectural visible bit which indicates whether the computer system 300 is currently running in the serial mode of operation wherein data may be processed by the master processor 301, or in a parallel mode of operation wherein data may be processed both by the master processor 301 and one or more of the slave processors 321, 331. The control register bit 309 may indicate whether the parallel mode of operation is allowed. If the control register bit 309 is set to a first value, for example to the value "ON," programs may run in the parallel mode of operation of the computer system 300. If, however, the control register bit 309 is set to a second value, for example to the value "OFF," then the computer system 300 may be used only in the serial mode of operation.

Similar to the master processor 301, each of the slave processors 321, 331 may comprise an indicator bit and a control register bit. In FIG. 2a, reference numerals 328, 338, denote indicator bits of the slave processors 321, 331 and reference numerals 329, 339 denote control register bits of the slave processors 321, 331. In other embodiments, the slave processors 321, 331 need not comprise indicator bits 328, 329. In such embodiments, the control register bit 309 of the master processor 301 may be used to indicate that the parallel mode of operation of the computer system 300 is allowed, and the indicator bit 309 of the master processor 301 may be used to indicate that the computer system 300 is in the parallel mode of operation.

The first slave processor 321 may further comprise a running status bit 330. The running status bit 330 indicates whether the first slave processor 321 is currently running or whether the first slave processor 321 is stopped. For example, a value "ON" of the running status bit 330 may indicate that the first slave processor 321 is currently running, and a value "OFF" of the running status bit 330 may indicate that the first slave processor 321 is stopped. Similar to the first slave processor 321, the second slave processor 331 may also comprise a running status bit 340.

In the system memory 304, a buffer memory 313 may be provided. In the buffer memory 313, the content of some or all of the registers 302-307 of the master processor, the content of some or all of the registers 322-325, 332-335 of the slave processors 321, 331 and further information. such as, for example, values of the indicator bits 308, 328, 338, the control register bits 309, 329, 339 and/or the running status bits 330, 340, may be stored in case of an interrupt or exception occurring while the computer system 300 is in the parallel mode of operation, as will be explained in mode detail below. In case multitasking is performed on the computer system 300, an individual buffer memory may be allocated for each process.

In some embodiments, the buffer memory 313 may be allocated by calling a CPU driver routine from the code of a program wherein the parallel mode of operation of the computer system 300 is to be used. The CPU driver routine may be adapted to allocate a memory area of a size sufficient to save the content of the registers 302-307, 322-325 and 332-335 and, optionally, further information, as detailed above. In some embodiments, the buffer memory 313 may be provided in a non-paged pool system memory which will not be swapped to a mass storage device such as, for example, a hard disk by the operating system. In some computer systems 300, an allocation of a memory in the non-paged pool system memory may be allowed only to CPU driver routines.

Advantageously, allocating the memory buffer 313 in the non-paged pool system memory may help to insure that the memory buffer 313 will always remain in the physical memory and no page faults will occur. This may make it easier to write and read, respectively, contents of the second plurality of registers 309-312 and, optionally, further data to and from the buffer memory 313 by means of an atomic operation. Thus, errors which might occur in case of an interrupt or exception while data are written to the memory buffer 313 may be advantageously avoided.

The CPU driver routine may be configured to return a memory address of the memory buffer 313. In some embodiments, the memory address may be a virtual address. This may help to isolate all processes running on the computer system 300 from each other, and may require that for each process a separate memory page is used. If the allocation of the memory buffer 313 is not possible, for example, if no memory is available in the non-paged pool memory area, the CPU driver routine may indicate a failure.

In some embodiments, the CPU driver routine for allocating the buffer memory 313 may be part of a CPU driver which may be provided by the processor vendor. In addition to the CPU driver routine for allocating the buffer memory 313, a second CPU driver routine for freeing the buffer memory 313 may be provided. As persons skilled in the art know, CPU driver routines may be loaded by the operating system during the boot of the operating system and provide functions which may be executed by programs running on the computer system 300. Thus, a program using the second mode of operation may call the CPU driver routines for allocating and freeing the memory buffer 313.

The computer system 300 may comprise an enabling instruction for enabling the parallel mode of operation of the computer system 300. The enabling instruction receives, as operands, an address, for example a virtual address, of the buffer memory 313, and an address of a trampoline instruction. The trampoline instruction is provided by the computer system 300. In some embodiments, the trampoline instruction may be provided by the master processor 301. Usually, the trampoline instruction is employed in order to restore the content of some or all of the registers 302-307, 322-325 and 332-335 after the completion of an interrupt routine, as will be explained in more detail below. The trampoline instruction may be provided in a program using the parallel mode of operation, and the address of the trampoline instruction may be a pointer to a memory location of the trampoline instruction provided in the program.

The computer system 300 may be configured to perform the following steps if the enabling instruction is called. The computer system 300 can check the control register bit 309. If the control register bit 309 indicates that the parallel mode of operation is not allowed, the enabling instruction will generate an illegal instruction fault, and no further steps are performed. Otherwise, a first of the second subset 306, 307 of the registers 302-307 of the master processor 301, for example the register 306, may be set to the address of the buffer memory 313, and a second of the second subset 306, 307 of the registers 302-307, for example the register 307, may be set to the address of the trampoline instruction. In other embodiments, another one of the registers 301-307 of the master processor 301 may be used to store the addresses of the buffer memory 313 and the trampoline instruction. Furthermore, the computer system 300 may set the indicator bit 308 and, optionally, the indicator bits 328, 338 of the slave processors 321, 331 to a value indicating that the computer system is in the parallel mode of operation. Subsequently, the computer system 300 may execute the next instruction in the parallel mode of operation.

In some embodiments, the enabling instruction may further be configured to clear the registers 322-325, 332-335 of the slave processors 321, 331. Thus, a propagation of state information between different processes may be avoided, which may help to increase the security of the computer system 300.

The computer system 300 may further comprise a variable sending instruction adapted to write contents of one or more of the registers 302-307 of the master processor 301 to one or more of the registers 322-325, 332-335 of one of the slave processors 321, 331. In some embodiments, the variable sending instruction receives, as operands, an identification number of the slave processor 321, 331 to whose register the content is to be written, data identifying the registers of the master processor 301 whose content is to be sent to the slave processor 321, 331, and data identifying the registers of the slave processor 321, 331 whose value is to be set. In one embodiment, the variable sending instruction may be configured to send the contents of one of the registers of the master processor 301 at a time to one of the slave processors 321, 331, and the data identifying the registers of the master processor 301 and the respective slave processor 321, 331 may comprise identification numbers of the respective registers of the master processor 301 and the slave processor 321, 331.

The computer system 300 may be configured to perform the following steps if the variable sending instruction is called. The computer system 300 can check the indicator bit 308. If the indicator bit 308 indicates that the computer system 300 is not in the parallel mode of operation, the variable sending instruction will generate an illegal instruction fault and no further steps are performed. Otherwise, it may be checked whether the variable sending instruction is executed by the master processor 301. If the variable sending instruction is executed by one of the slave processors 321, 331, an illegal instruction fault is generated and no further actions are performed. Otherwise, the content of the one or more of the registers 302-307 of the master processor 301 specified in the operand of the variable sending instruction is written to the specified registers of the specified slave processor 321, 331. Subsequently, the computer system 300 may execute the next instruction.

The computer system 300 may further comprise a variable receiving instruction adapted to write contents of one or more of the registers 322-325, 332-335 of one of the slave processors 321, 331 to one or more of the registers 302-307 of the master processor 301. The variable receiving instruction may receive, as operands, an identification number of the slave processor 321, 331 from which the variables are to be received, data identifying the registers of the slave processor 321, 331 whose content is to be read, and data identifying the registers of the master processor 301 whose value is to be set. Similar to the variable sending instruction, the data identifying the registers may comprise an identification number of a register of the slave processor 321, 331 and an identification number of a register of the master processor 301.

The computer system 300 may be configured to perform the following steps if the variable receiving instruction is called. The computer system 300 can check the indicator bit 308. If the indicator bit 308 indicates that the computer system 300 is not in the parallel mode of operation, the variable receiving instruction will generate an illegal instruction fault and no further actions are performed. Otherwise, it is checked whether the variable receiving instruction is executed by the master processor 301. If the variable receiving instruction is executed by one of the slave processors 321, 331, the variable receiving instruction generates an illegal instruction fault and no further actions are performed. Otherwise, the content of the specified one or more registers of the specified slave processor 321, 331 is written to the specified register of the master processor 301.

The variable sending instruction and the variable receiving instruction may be used to exchange information between the master processor 301 and the slave processors 321, 331. In particular, the variable sending instruction may be used to set up parameters of the slave processors 321, 331 before threads are started in the slave processors 321, 331, and the variable receiving instruction may be used to retrieve a result value or a pointer to a memory location comprising one or more result values after the execution of a thread is completed, as will be explained in more detail below.

The computer system 300 may further comprise a fork instruction adapted to initiate instruction execution by one of the slave processors 321, 331. The fork instruction may receive, as operands, an identification number of the slave processor 321, 331 on which the instruction execution is to be started, and a target address at which the instruction execution is to be started.

The computer system 300 may be configured to perform the following steps if the fork instruction is called. The computer system 300 can check the indicator bit 308. If the indicator bit 308 indicates that the computer system 300 is not in the parallel mode of operation, an illegal instruction fault is generated and no further actions are performed. Otherwise, it is checked whether the fork instruction is executed by the master processor 301. If the fork instruction 301 is executed by one of the slave processors 321, 331, an illegal instruction fault is generated and no further actions are performed. Otherwise, the specified target address is sent to the specified slave processor 321, 331. The slave processor 321, 331 receives the target address. In the slave processor 321, 331, the running status bit 330, 340 is set to a value indicating that the slave processor 321, 331 is running and the slave processor 321, 331 starts the instruction execution at the target address. Thereafter, further instructions may be executed.

Using the variable sending instruction, the variable receiving instruction and/or the fork instruction while the respective slave processor 321, 331 specified in the operand of the instruction is running may, in some embodiments, generate unpredictable results. In such embodiments, the code of programs running on the computer system may be adapted such that this is not happening. In other embodiments, the computer system 300 may be adapted to generate an illegal instruction fault if the variable sending instruction, the variable receiving instruction or the fork instruction is called while the slave processor 321, 331 specified in the operand is running.

The computer system 300 may further comprise a slave join instruction adapted to stop instruction execution by one of the slave processors 321, 331. The slave join instruction may be executed by one of the slave processors 321, 331, and instruction execution may be stopped on the slave processor executing the slave join instruction. More specifically, the computer system 300 may be adapted to perform the following steps if the slave join instruction is called. The computer system 300 can check the indicator bit 308. If the indicator bit 308 indicates that the computer system 300 is not in the parallel mode of operation, an illegal instruction fault is generated and no further actions are performed. Otherwise, it is checked whether the slave join instruction is executed by one of the slave processors 321, 331. If the slave join instruction is not executed on a slave processor 321, 331, an illegal instruction fault is generated and no further actions are performed. Otherwise, the running status bit 330 is set to a value indicating that the slave processor 321, 331 is not running and the instruction execution at the slave processor 321, 331 may be stopped.

The computer system 300 may further comprise a master join instruction adapted to keep the master processor 301 waiting until the instruction execution at one of the slave processors 321, 331 is stopped. The master join instruction may receive, as operands, an identification number of one of the slave processors 321, 331 for which the master processor 301 has to wait.

The computer system 300 may be configured to perform the following steps if the master join instruction is called. The computer system 300 can check the indicator bit 308. If the indicator bit 308 indicates that the computer system 300 is not in the parallel mode of operation, an illegal instruction fault is generated and no further actions are taken. Otherwise, it is checked whether the master join instruction is executed by the master processor 301. If the master join instruction is not executed by the master processor 301, an illegal instruction fault is generated and no further actions are performed. Otherwise, it is checked whether the running status bit 330, 340 of the slave processor 321, 331 specified in the operand of the master join instruction indicates that the respective slave processor 321, 331 is running. Then, the master processor 301 waits until the running status bit 330, 340 is set to a value indicating that the slave processor 321, 331 is not running any more. Then, instruction execution in the master processor 301 may be continued with the instruction following the master join instruction.

In other embodiments, the master join instruction may check whether the respective slave processor 321, 331 is still running or not. Then, it may return this result in an architectural visible register, for example in one of the registers 302-307 of the master processor 301. A program running on the computer system 300 then can use that status to determine further operation. Thus, the master processor 301 may check the running state of the respective slave processor 321, 331 and then continue program execution. In such embodiments, further features of the master join instruction may be similar to those of the other embodiments described above.

The slave join instruction and the master join instruction may be used to synchronize threads running in the master processor 301 and the slave processors 321, 331. The master join instruction may specify exactly one of the slave cores 321, 331. Thus, threads running in different slave processors may be synchronized at different points of time during the execution of the program without there being a need for a common join point for all threads. Thus, a greater degree of flexibility may be obtained.

The present invention is not restricted to embodiments wherein a master join instruction and a slave join instruction being distinct from each other are provided. In other embodiments, a single join instruction may be provided. When the join instruction is called, it is checked whether the join instruction is executed in the master processor 301 or in one of the slave processors 321, 331. If the join instruction is executed in one of the slave processors 321, 331, steps corresponding to those described above for the slave join instruction are performed. Conversely, if the join instruction is executed in the master processor 301, steps corresponding to those described above for the master join instruction may be performed.

As already mentioned above, the computer system 300 may further comprise a trampoline instruction. The trampoline instruction may be used to restore the content of some or all of the registers 302-307 of the master processor 301 and the registers 322-325, 332-335 of the slave processors 321, 331 after the completion of an interrupt routine.

The trampoline instruction may be adapted to perform the steps of switching the computer system 300 into the parallel mode of operation and reading contents of the registers 322-325, 332-335 and a return address of the master processor 301 from the buffer memory 313 if the interrupt occurred in the master processor 301. Additionally, contents of the second subset 306, 307 of the registers 302-307 may be read from the buffer memory.

The trampoline instruction may further be adapted to perform the steps of switching the computer system 300 to the parallel mode of operation, reading the contents of the registers 322-325, 332-335 of the slave processors 321, 331 from the buffer memory, writing the contents of one or more of the registers 302-307 of the master processor to registers of the slave core 321, 331 in which the interrupt or exception occurred and reading contents of the registers 302-307 of the master processor 301 from the buffer memory if the interrupt or exception occurred in one of the slave processors 321, 331.

In some embodiments, the computer system 300 may be configured to perform the following steps if the trampoline instruction is called. The computer system 300 can check the control register bit 309. If the control register bit 309 indicates that the parallel mode of operation of the computer system 300 is not allowed, an illegal instruction fault is generated. Otherwise, the address of the buffer memory 313 may be read from one of the registers 302-307 of the master processor 301. In some embodiments, the address of the buffer memory 313 may be read from one of the first subset 302-305 of the registers 302-307 of the master processor 301, for example from the register 305.

Thereafter, the computer system 300 may read an identification number of the processor which caused the interrupt or exception from the buffer memory 313. In some embodiments, the master processor 301 may have the identification number 0, the first slave processor 321 may have the identification number 1 and the second slave processor 331 may have the identification number 2. In embodiments wherein a number of slave processors different than 2 is provided, each of the slave processors may have an identification number being a natural number greater than zero, and the master processor 301 may have the identification number zero. In further embodiments, a different numbering scheme of the processors 301, 321, 331 may be used. The computer system 300 may then determine from the identification number whether the interrupt or exception was caused by the master processor 301 or by one of the slave processors 321, 331.

If the interrupt or exception was caused by the master processor 301, which may be indicated by a processor identification number equal to zero, the computer system 300 may read the contents of each of the registers 322-325 of the first slave processor 321 and the registers 332-335 of the second slave processor 331 from the buffer memory 313. Additionally, the content of the second subset 306, 307 of the registers 302-307 of the master processor 301 may be read from the buffer memory 313. Furthermore, a return address of the master processor 301 may be read from the buffer memory. In some embodiments, the return address of the master processor may be written to one of the registers of the master processor 301, for example to the register 302. Furthermore, the running status bits 330, 340 of the slave processors 321, 331 may be read from the buffer memory 313. In some embodiments, the content of the registers 322-325, 332-335 of the slave processors 321, 331 read from the buffer memory 313 may comprise return addresses of the slave processors 321, 331. In other embodiments, return addresses of the slave processors 321, 331 may be separately read from the buffer memory 313.

Thereafter, the contents of one of the second subset 306, 307 of the registers 302-307 of the master processor 301, for example the contents of the register 306, and the contents of the register from which the address of the buffer memory was read, for example the content of the register 305, may be swapped. Thus, the address of the buffer memory 313 is written to the register 306, which may be the register wherein the address of the buffer memory 313 is stored by the enabling instruction. Another register of the second subset 306, 307, which was read from the buffer memory 313, for example the register 307, may comprise the address of the trampoline instruction.

Subsequently, the indicator bit 308 may be set to a value indicating that the computer system 300 is in the parallel mode of operation, for example to the value "ON." Thus, the computer system 300 may be switched to the parallel mode of operation, and instruction execution may be started in each of the slave processors 321, 331 wherein the running status bit 330, 340 indicates a running state of the respective slave processor 321, 331. In the master processor 301, instruction execution is continued at the return address read from the buffer memory 301. Hence, processing of a program interrupted by the interrupt or exception may be continued in the parallel mode of operation of the computer system 300.

If the interrupt or exception was caused by one of the slave processors 321, 331, the contents of the registers 322-325 of the first slave processor 321 and the registers 332-335 of the second slave processor 331, as well as the running status bits 330, 340, may be read from the buffer memory 313. Additionally, the contents of the second subset 306, 307 of the registers 302-307 of the master processor 301 may be read from the buffer memory 313. The register 307 or, in other embodiments, another one of the second subset 306, 307 of registers may comprise the address of the trampoline instruction.

Thereafter, the contents of the one of the registers from which the address of the buffer memory was read, for example the contents of the register 305, may be written to a temporary register which may, for example, be provided in the buffer memory 313, and the contents of a corresponding register of the slave processor 321, 331 which caused the interrupt or exception may be read from the buffer memory 313 into the register 305. For example, if the interrupt or exception was caused by the first slave processor 321, the stored contents of the register 325 of the first slave processor 321 may be read from the buffer memory 313 into the register 305. If the interrupt or exception was caused by the second slave processor 331, the stored contents of the register 335 of the second slave processor 331 may be read from the buffer memory 313 into the register 305.

As will be explained in more detail below, after the completion of the interrupt routine, the other registers 302-304 of the first processor 301 comprise the contents of registers of the slave processor 321, 331 in which the interrupt or exception occurred, wherein the contents of some of the registers may have been modified by the interrupt routine. Hence, after writing the contents of a corresponding register of the slave processor wherein the interrupt or exception occurred into the register 305 of the master processor 301, the first subset 302-305 of the registers of the master processor 301 comprises data representative of contents of the corresponding registers of the slave processor wherein the interrupt or exception occurred, wherein the contents of some of the registers may have been modified by the interrupt routine.

The contents of the first subset 302-305 of the registers 302-305 of the master processor 301 may now be written to the register of the slave processor 321, 331 wherein the interrupt or exception occurred. For example, if the interrupt or exception occurred in the first slave processor 321, the contents of the registers 302-305 may be written to the registers 322-325 of the first slave processor 321. If the interrupt or exception occurred in the second slave processor 331, the contents of the registers 302-305 may be written to the registers 332-335 of the second slave processor 331. Thus, modifications of register contents caused by the interrupt routine may be written to the registers of the slave processor 321, 331.

The present invention is not restricted to embodiments wherein the contents of each of the first subset 302-305 of the registers 302-307 of the master processor are copied to registers of the slave processor which caused the interrupt or exception. In other embodiments, only the contents of some of the first subset 302-305 of registers which may be modified by interrupt routines may be copied to the slave processor. Thus, the execution of the trampoline instruction may be accelerated, since a smaller amount of data needs to be copied from the master processor 301 to the slave processor 321, 331.

After writing the contents of some or all of the first subset 302-305 of the registers 302-307 of the master processor 301 to registers of the slave processor 321, 331 which caused the interrupt or exception, contents of the first subset 302-305 of the registers 302-307 of the master processor 301, which may also include a return address of the master processor 301, may be read from the buffer memory 313. Furthermore, the address of the buffer memory 313 which was saved to the temporary register may be written to one of the second plurality of registers of the master processor 301, for example to the register 306. Thus, a state of the master processor 301 before the interrupt or exception may be restored.

Subsequently, the indicator bit 308 of the master processor 300 and, optionally, the indicator bits 328, 338 of the slave processors 321, 331, may be set to a value indicating that the computer system 300 is operated in the parallel mode of operation, and instruction execution may be enabled in each of the slave processors 321, 331 wherein the running status bit 330, 340 indicates that the respective slave processor was running before the interrupt or exception. Moreover, instruction execution in the master processor 301 may be started at the return address of the master processor 301. Hence, in the computer system 300, execution of the program may be continued.

The computer system 300 may be adapted to perform the above-described steps of the trampoline instruction as an atomic operation. Thus, errors resulting from an interrupt or exception occurring during the execution of the trampoline instruction may be advantageously avoided.

The computer system 300 may further comprise an end instruction adapted to switch the computer system 300 from the parallel mode of operation to the serial mode of operation. For this purpose, the computer system 300 may set the indicator bit 308 and, optionally, the indicator bits 328, 338 of the slave processors 321, 331 to values indicating that the computer system 300 is operating in the serial mode of operation. In one embodiment, the indicator bits 308, 328, 338 may be set to the value "OFF."

The computer system 300 may further be adapted to perform, in case of an interrupt or exception occurring during the parallel mode of operation, the steps of saving the contents of at least a portion of the content of the registers 302-307 of the master processor 301 and the registers 322-325, 332-335 of the slave processors 321, 331 and, optionally, the values of the running status bits 330, 340 of the slave processors 321, 331 to the buffer memory 313, and switching the computer system 300 to the serial mode of operation. If the interrupt or exception is occurring in one of the slave processors 321, 331, the computer system 300 may additionally set the content of at least one of the registers 302-307 of the master processor to the content of at least one of the registers of the respective slave processor. Thus, data in the registers of the processors 301, 321, 331 may be saved independently of the operating system. If the interrupt or exception is occurring in one of the slave processors 321, 331, data relevant for an interrupt routine of the operating system may be written from the slave processor 321, 331 to registers of the master processor 301. Hence, such data may be handled by the operating system, wherein the operating system need not take the presence of the slave processors 321, 331 into account. In particular, the operating system need not be adapted to obtain data relevant for the execution of an interrupt routine from any of the slave processors 321, 331.

In some embodiments, the computer system 300 may be configured to perform the following steps if an interrupt or exception occurs while the indicator bit 308 is set to a value which indicates that the computer system 300 is in the second mode of operation. The actions performed by the computer system 300 may depend on whether the interrupt or exception occurs in the master processor 301 or in one of the slave processors 321, 331.

If the interrupt or exception is occurring in the master processor 301, the computer system 300 can stop instruction execution in the slave processors 321, 331. After the execution of instructions in each of the slave processors 321, 331 has stopped, the computer system 300 may write contents of the registers 322-325, 332-335 of the slave processors 321, 331 to the buffer memory 313, the address of which may be read from one of the second subset 306, 307 of the registers 302-307 of the master processor 301, for example from the register 306. These registers may include the return address for each of the slave processors 321, 331. Additionally, the running status bits 330, 340 of the slave processors 321, 331 may be saved to the buffer memory 313. The running status bits 330, 340 indicate whether each of the slave processors 321, 331 was executing instructions before the interrupt or exception occurred. Furthermore, an identification number of the master processor 301 may be saved to the buffer memory 313. As already mentioned above, in some embodiments, the master processor 301 may have identification number zero. In such embodiments, the identification number zero may be saved to the buffer memory 313 if the interrupt or exception occurred in the master processor 301.

Subsequently, contents of the one of the second subset 306, 307 of the registers 302-307 of the master processor 301 comprising the address of the buffer memory 313, which may, in some embodiments, be the register 306, may be swapped with the contents of one of the first subset 302-305 of the registers 302-307 of the master processor 301, for example with the contents of the register 305. The register whose content is swapped with the register 306 may be identical to the register from which the address of the buffer memory 313 is read by the trampoline instruction.

The first subset of registers 302-305 of the master processor 301 may correspond to the set of registers of a processor according to the state of the art. Hence, an operating system adapted to the processor according to the state of the art running on the computer system 300 may be configured to save the contents of the first subset 302-305 of registers of the master processor 301 in case of an interrupt or exception, and to restore the contents of the first subset 302-305 of registers after the completion of an interrupt routine being part of the operating system. Hence, swapping the contents of the register comprising the address of the buffer memory and one of the first subset 302-305 of registers may insure that the address of the buffer memory is present in one of the registers 302-305 of the master processor 301 after the completion of the interrupt routine and may be accessed by the trampoline instruction. Moreover, in the parallel mode of operation of the computer system 300, each of the registers 302-305 of the first subset may be used by a program running on the computer system 300, since, in the parallel mode of operation, the address of the buffer memory 313 is stored in one of the second subset 306, 307 of the registers of the master processor. Thus, a compatibility of the computer system 300 with the computer system 100 according to the state of the art may be improved.

Then, the contents of the second subset 306, 307 of the registers 302-307 of the master processor 301 may be saved to the buffer memory 313. Thereafter, a return address of the master processor 301 may be retrieved. In some embodiments, the return address of the master processor 301 may be read from one of the first subset of registers, for example from the register 302. After saving the return address of the master processor 301, the return address of the master processor 301 may be replaced with the address of the trampoline instruction which may be read from one of the second subset 306, 307 of the registers 302-307 of the master processor 301, for example from the register 307. Hence, after the completion of the interrupt routine of the operating system, the trampoline instruction is called to restore the contents of the second subset 306, 307 of registers of the master processor 301, the contents of the registers 322-325, 332-335 of the slave processors 321, 331 and the running status bits 330, 340 of the slave processors 321, 331 which are not restored by the operating system. The registers of the slave processors 321, 331 may include the return address for each of the slave processors 321, 331.

If the interrupt or exception is occurring in one of the slave processors 321, 331, the execution of instructions in the master processor 301, as well as in each of the slave processors 321, 331, may be stopped. After the execution of instructions has stopped in all processors 301, 321, 331, the computer system 300 may save the contents of each of the registers 302-307 of the master processor 301 to the buffer memory 313, the address of which may be read from one of the second subset 306, 307 of the registers 302-307 of the master processor 301, for example from the register 306. Additionally, the contents of the registers 322-325, 332-335 of each of the slave processors 321, 331, as well as the values of the running status bits 330, 340 of each of the slave processors 321, 331, may be saved to the buffer memory 313. The values of the running status bits 330, 340 indicate which of the slave processors 321, 331 were running at the point of time when the interrupt or exception occurred.

Thereafter, the contents of the one of the second subset 306, 307 of the registers 302-307 of the master processor 301 wherein the address of the buffer memory 313 is stored may be written to a temporary register which may, in some embodiments, be provided in the buffer memory 313. Additionally, an identification number of the slave processor 321, 331 wherein the interrupt or exception occurred may be saved in the buffer memory 313. In some embodiments, the first slave processor 321 may have the identification number 1 and the second slave processor 331 may have the identification number 2. In such embodiments, the identification number 1 may be saved to the buffer memory 313 if the interrupt or exception occurred in the first slave processor 321, and the identification number 2 may be saved to the buffer memory 313 if the interrupt or exception occurred in the second slave processor 331. The registers of the slave processors 321, 331 may include the return address for each of the slave processors 321, 331.

Subsequently, the contents of the registers of the slave processor 321, 331 wherein the interrupt or exception occurred may be written to the first subset 302-305 of the registers 302-307 of the master processor 301. If the interrupt or exception occurred in the first slave processor 321, the contents of the registers 322-325 of the first slave processor 321 may be written to the registers 302-305 of the master processor 301. Similarly, if the interrupt or exception occurred in the second slave processor 331, the contents of the registers 322-325 of the second slave processor 331 may be written to the registers 302-305. The present invention is not restricted to embodiments wherein the contents of each of the registers 322-325 or 332-335, respectively, of the first slave processor 321 or the second slave processor 331, respectively, is written to corresponding registers of the master processor 301. In other embodiments, only the contents of some slave processor registers which may be modified by an interrupt routine of the operating system may be written to registers of the master processor 301.

In the interrupt routine, the operating system will handle the contents of the first subset 302-305 of the registers 302-307 of the master processor 301 which may correspond to the set of registers of a processor according to the state of the art, for example to the registers 102-105 of the state of the art processor 101 described above with reference to FIGS. 1a-1b. The contents of the registers 302-305 may comprise all information about the interrupt or exception relevant to the operating system, including a memory address of a stack of the slave processor 321, 331 comprising further information about the interrupt or exception.

After writing the contents of the registers of the slave processor 321, 331 wherein the interrupt or exception occurred to the registers 302-305 of the master processor 301, the state of the master processor 301 may correspond to a state which would have been obtained if the interrupt or exception would have occurred in the master processor 301. Hence, to the operating system, it will look as if the master processor 301 would have encountered the interrupt or exception. Thus, the operating system may handle the interrupt or exception even in embodiments wherein the operating system is adapted to a computer system comprising only a single processor.

Thereafter, the contents of one of the first subset 302-305 of the registers 302-307 of the master processor 301, for example the register 305 (the content of which is identical to that of a corresponding register of the slave processor 321, 331 wherein the interrupt or exception occurred), may be written to the buffer memory 313, the address of which may be retrieved from the temporary buffer, and the address of the buffer memory 313 may be written to the register 305. Thus, the address of the buffer memory 313 may be provided in one of the first subset 302-305 of the registers 302-307 of the master processor 301 which may be restored by the operating system after the completion of the interrupt routine.

Subsequently, the return address of the master processor 301 may be stored in the buffer memory 313, and the return address of the master processor 301 may be replaced with the address of the trampoline instruction, which may be read from one of the second subset 306, 307 of the registers 302-307 of the master processor 301, for example from the register 307. Thus, the trampoline instruction may be executed after the completion of the interrupt routine.

The above-described steps performed by the computer system 300 in case of an interrupt or exception occurring during the parallel mode of operation of the computer system 300 may be carried out as an atomic operation. As persons skilled in the art know, the occurrence of an interrupt or exception while the computer system 300 performs the steps may thus be avoided.

After carrying out the above-described steps, irrespective of whether the interrupt or exception occurred in the master processor 301 or in one of the slave processors 321, 331, the computer system 300 may set the indicator bit 308 of the master processor 301 to a value indicating that the computer system 300 is in the serial mode of operation, for example to the value "OFF." In this manner, the computer system 300 may be switched to the serial mode of operation. Thereafter, an interrupt routine of the operating system may be carried out.

Figure 2B:
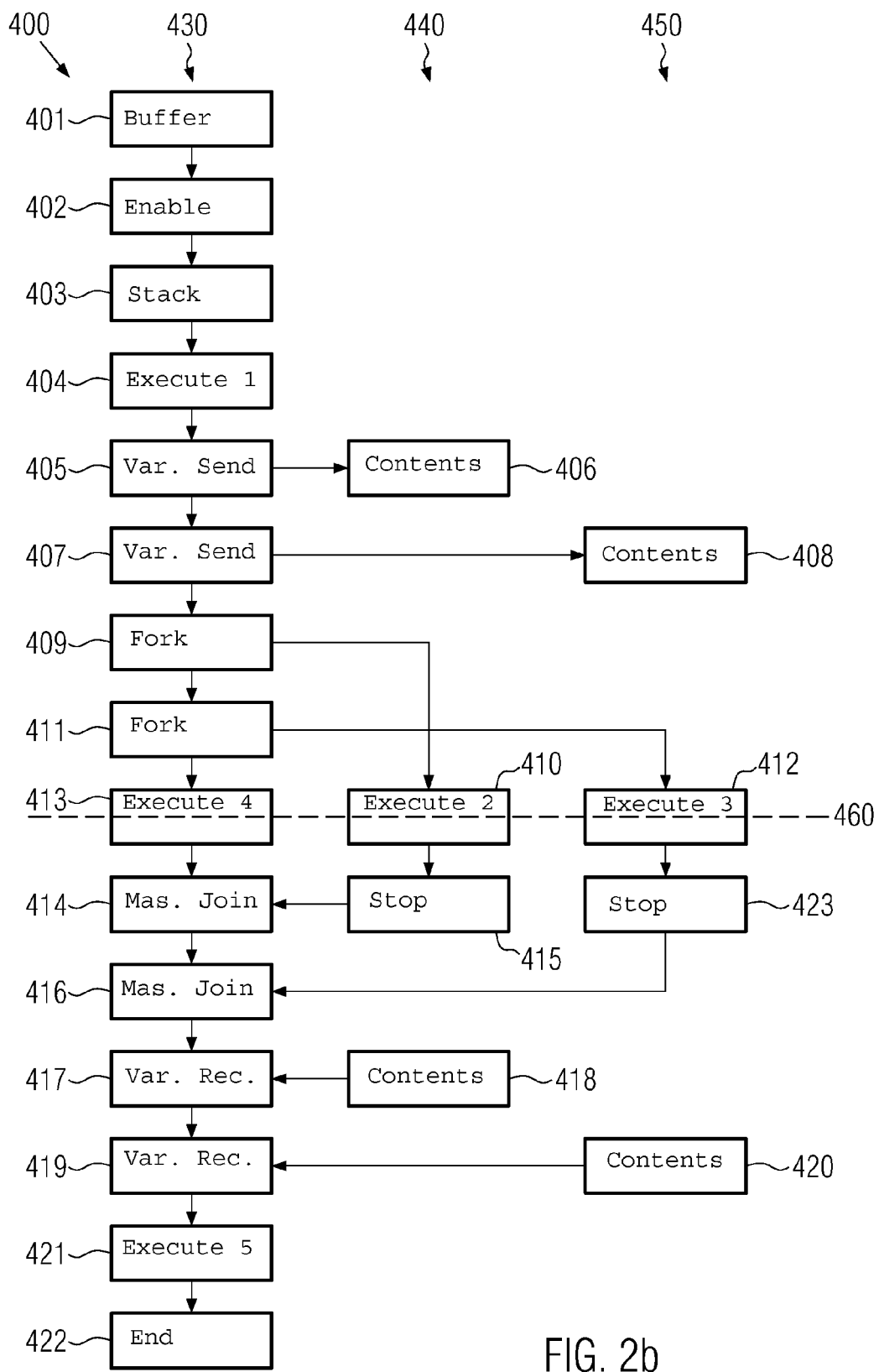
FIG. 2*b* shows a schematic flow diagram of a program running on a computer system according to an illustrative embodiment disclosed herein.

In the following, the operation of the computer system 300 will be described with respect to FIG. 2b, which shows a schematic flow diagram of a program 400 running on the computer system 300, and with respect to FIG. 2c, which shows a schematic flow diagram of the program 400 and an interrupt routine 502.

The master processor 301 and the slave processors 321, 331 may be identified before the operating system of the computer system 300 is loaded. In some embodiments, the assignment of a processor being the master processor 301 or one of the slave processors 321, 331 may be provided in the form of hardware. In such embodiments, the assignment of being the master processor 301 or one of the slave processors 321, 331 may remain constant throughout the lifetime of the computer system 300. In other embodiments, the assignment of being the master processor 301 or one of the slave processors 321, 331 may be effected by means of software. For example, the master processor 301 and the slave processors 321, 331 may be identified by a basic input/output software (BIOS) of the computer system 300. In such embodiments, the assignments of the processors may be varied by modifying the BIOS settings of the computer system 300.

After identifying the master processor 301 and the slave processors 321, 331, the operating system of the computer system 300 may be loaded. When the operating system has started, the computer system 300 may be in the serial mode of operation. Thus, the master processor 301 may provide the functionality of a computer processor according to the state of the art, for example the functionality of the processor 101 in the computer system 100 described above with reference to FIGS. 1a-1b. Hence, the computer system 300 may cooperate with the operating system which may, in some embodiments, be adapted to the computer system 100 according to the state of the art. Once the operating system is running on the computer system 300, the program 400 may be started.

In a step 401 of the program 400, the buffer memory 313 may be allocated in the system memory 304 by calling a CPU driver routine provided for this purpose. Thereafter, in step 402, the enabling instruction may be executed to enable the parallel mode of operation of the computer system 300, and, in step 403, stack memory for threads of the program which are to be executed by the slave processors 321, 331 may be allocated. Memory allocation techniques well known to persons skilled in the art may be used for allocating the stack memory.

In step 404, a first plurality of instructions may be carried out. The first plurality of instructions may be executed by the master processor 301 in a serial manner. Since the master processor 301 may provide the instruction set of a processor according to the state of the art such as, for example, the processor 101 described above with reference to FIGS. 1a-1b, the first plurality of instructions may comprise code which may also be executed by the processor according to the state of the art. Hence, the first plurality of instructions may be generated by means of a compiler adapted to provide code for the processor 101 according to the state of the art. Thus, code from existing libraries may be included in the program 400.

In step 405, the variable sending instruction may be called once or more to send data to the registers 322-325 of the first slave processor 321. Thus, the first master processor 321 may be prepared for executing a thread of the program 400. In step 407, the variable sending instruction may be used to send data to the registers 332 to 335 of the second slave processor 331 in order to prepare the second slave processor for executing another thread of the program 400. The present invention is not restricted to embodiments wherein first data are sent to the registers 322-325 of the first slave processor 321, and then data are sent to the second slave processor 331. In other embodiments, data may be sent to the registers 332-335 of the second slave processor 331 before sending data to the registers 322-325 of the first slave processor 321.

In step 409, the fork instruction may be executed in order to initiate the execution of instructions in the first slave processor 321. Thus, in step 410, a second plurality of instructions may be executed by the first slave processor 321. In step 411, the fork instruction may be employed in order to start the execution of instructions in the second slave processor 331. Hence, in step 412, the second slave processor 331 may execute a third plurality of instructions. Subsequently, the master processor 301 may execute a fourth plurality of instructions. The second plurality of instructions, the third plurality of instructions and the fourth plurality of instructions may be executed simultaneously by the computer system 300, wherein the execution of the second plurality of instructions, the execution of the third plurality of instructions and the execution of the fourth plurality of instructions form different threads of the program 400. Thus, the speed of execution of the program 400 may be increased compared to the computer system 100 according to the state of the art described above with reference to FIGS. 1*a*-1*b*.

In embodiments wherein each of the master processor 301 and the slave processors 321, 331 is adapted to provide the functionality of a particular type of processor, for example, the functionality of the processor 101 according to the state of the art described above with reference to FIGS. 1*a*-1*b*, each of the second, third and fourth plurality of instructions may comprise code adapted for execution in the respective type of processor. For example, each of the second, third and fourth plurality of instructions may comprise code adapted for execution in a processor of the type x86 or x86-64.

In other embodiments wherein the slave processors 321, 331 are processors of a different type than the master processor 301, the second plurality of instructions and the third plurality of instructions may comprise code specifically adapted for execution in the slave processors 321, 331, whereas the fourth plurality of instructions may comprise code specifically adapted for execution in the master processor 301.

After the completion of the thread comprising the second plurality of instructions, the first slave processor 321 may execute the slave join instruction in order to stop the execution of instructions in the first slave processor 321 (step 415). For this purpose, the slave join instruction may be provided as the last instruction of the second plurality of instructions. Similarly, the slave join instruction may also be provided as the last instruction of the third plurality of instructions such that the execution of instruction in the second slave processor 331 is stopped after the execution of the third plurality of instructions (step 423).

After the completion of the execution of the fourth plurality of instructions, the master processor 301 may execute in step 414 the master join instruction in order to wait until the first slave processor 321 has completed the execution of the second plurality of instruction. Subsequently, in step 416, the master join instruction may be executed once again by the master processor 301 in order to wait until the second slave processor 331 has completed the execution of the third plurality of instructions.

Thereafter, the master processor 301 may execute, in steps 417, 419, the variable receiving instruction in order to read results of the execution of the threads provided by the second plurality of instructions and the third plurality of instructions from the first slave processor 321 and the second slave processor 331, respectively. In FIG. 2*b*, the provision of the contents of the registers 322-325 by the first slave processor 321 is indicated by reference numeral 418 and the provision of the contents of the registers 332-335 by the second slave processor 331 is indicated by reference numeral 420.

Subsequently, the master processor 421 may execute a fifth plurality of instructions in a serial manner (step 421). Similar to the first plurality of instructions which are executed in step 404, the fifth plurality of instructions may comprise code adapted for execution in a processor according to the state of the art, such as the processor 101 described above with reference to FIGS. 1*a*-1*b*, the functionality of which is provided by the master processor 301. Hence, the fifth plurality of instructions may comprise code created by a compiler adapted to provide code for the processor 101 according to the state of the art.

Prior to the termination of the execution of the program 400, the master processor 301 may execute, in step 422, the end instruction in order to switch the computer system 300 into the serial mode of operation. Moreover, the buffer memory 313 may be freed before the execution of the program 400 is terminated, which may be done by calling a CPU driver routine provided in the computer system 300.

Figure 2C:
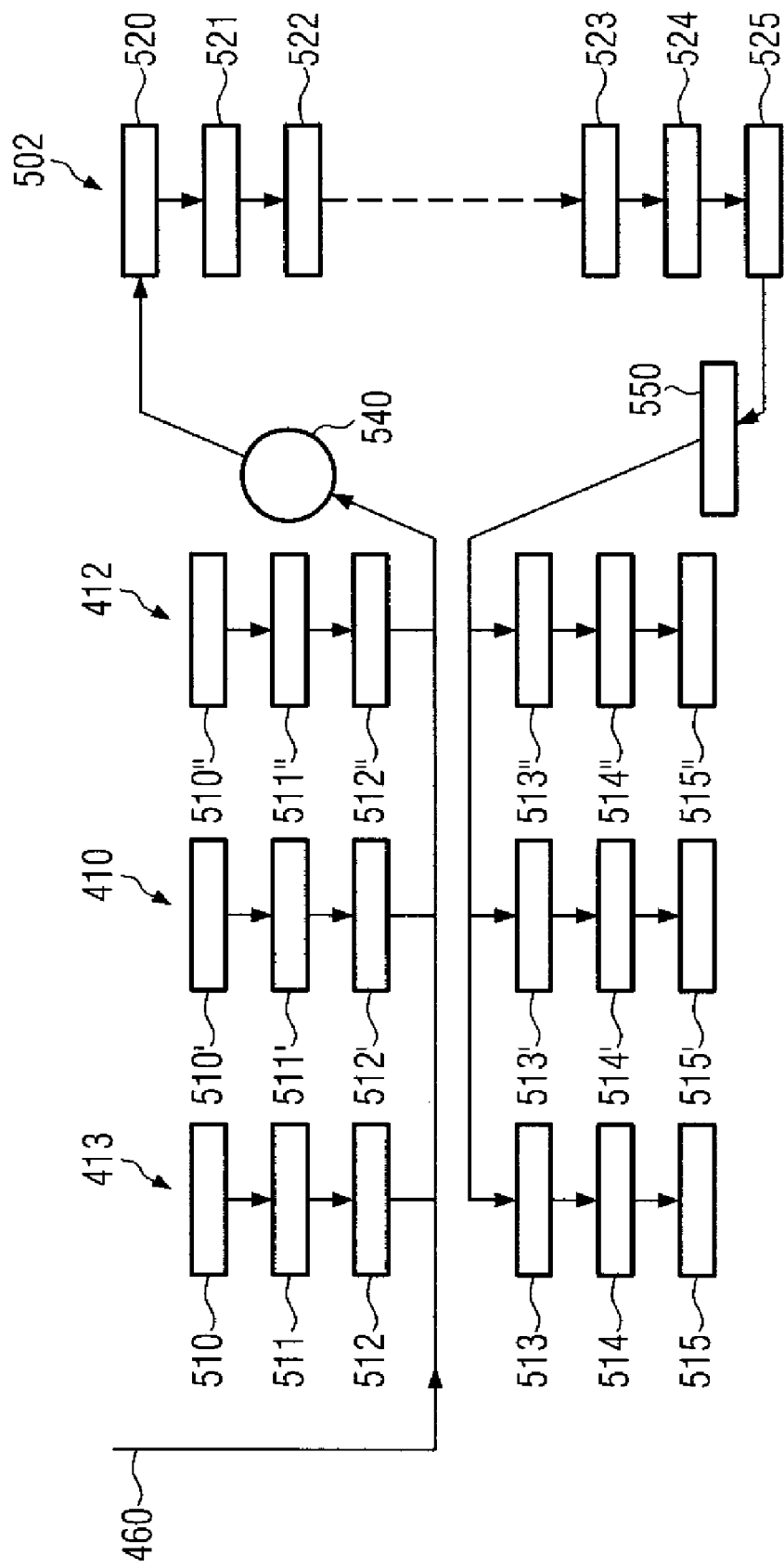
FIG. 2*c* shows a schematic flow diagram of a program and an interrupt routine running on a computer system according to an illustrative embodiment disclosed herein.

FIG. 2*c* shows a schematic flow diagram of the program 400 and an interrupt routine 502 which may be executed in case of an interrupt or exception which occurs while the second plurality of instructions, the third plurality of instructions and the fourth plurality of instructions are executed in the slave processors 321, 331 and the master processor 301, respectively.

In FIG. 2*c*, reference numerals 510, 511, 512 denote instructions of the fourth plurality of instructions which are executed by the master processor 301. Reference numerals 510', 511', 512' denote instructions of the second plurality of instructions which are executed by the first slave processor 321 and reference numerals 510", 511" and 512" denote instructions of the third plurality of instructions which are processed by the second slave processor 331.

At a point of time at which the instructions 512, 512', 512" are executed in the master processor 301 and in the slave processors 321, 331, respectively, an interrupt or exception 460 may occur. After the interrupt or exception 460, the system 300 may perform the steps of saving at least a portion of the contents of the registers 302-307 of the master processor 301 and the registers 322-325, 332-335 of the slave processors 321, 331 to the buffer memory 313 and switching the computer system 300 to the serial mode of operation. If the interrupt or exception occurred in one of the slave processors 321, 331, the computer system 300 may further write the contents of at least one of the registers 322-325 or 332-335, respectively, of the slave processor 321, 331 wherein the interrupt or exception occurred to at least one of the first subset 302-305 of the registers 302-307 of the master processor 301. In FIG. 2*c*, the actions performed by the computer system 300 in case of an interrupt or exception are indicated by reference numeral 540. The computer system 300 may also perform further actions in case of an interrupt or exception occurring while the computer system 300 is in the parallel mode of operation, as described above with reference to FIG. 2*a*.

Subsequently, the computer system 300 may perform instructions 520-525 of an interrupt routine 502. The interrupt routine 502 may be part of an operating system which comprises support for the serial mode of operation of the computer system 300, and which need not support the parallel mode of operation. Hence, the interrupt routine 502 may comprise instructions adapted to save the contents of the first subset 302-305 of the registers 302-307 of the master processor to the system memory 304, and to read the contents of the first subset 302-305 of registers from the system memory 304 at the end of the execution of the interrupt routine 502. Moreover, the interrupt routine 502 may modify the contents of some or all of the first subset 302-305 of the registers 302-307 of the master processor 301.

The interrupt routine 502, however, need not be adapted to save and restore the contents of the second subset 306, 307 of the registers 302-307 of the master processor 301, the contents of the registers 322-325 of the first slave processor 321, the contents of the registers 332-335 of the second slave processor 331 and the values of the running status bits 330, 340 of the slave processors 321, 331. In some embodiments, the interrupt routine 502 may be part of an operating system which allows multitasking. In particular, the interrupt routine 502 may be adapted to execute another program which may use the parallel mode of operation of the computer system 300, wherein the contents of the registers 306, 307, 322-325, 332-335 and the running status bits 330, 340 may be modified. Since the interrupt routine 502 need not restore the contents of the registers 306, 307, 322-325, 332-335 and the running status bits 330, 340 after the execution of a last instruction 525 of the interrupt routine 502, the contents of registers 306, 307, 322-325, 332-335 and the running status bits 330, 340 may be different from their contents after the execution of the instructions 512, 512', 512" of the program 400.

After the completion of the interrupt routine 502, the computer system 300 executes the trampoline instruction 550, since the return address of the master processor 301 on which the interrupt routine 502 may be executed has been replaced by the address of the trampoline instruction 550.

When executing the trampoline instruction 550, the computer system 300 may perform the steps described above with reference to FIG. 2a. After the execution of the trampoline instruction, the contents of each of the registers 302-307, 322-325, 332-335 and the running status bits 330, 340 of the processors 301, 321, 331 are restored, wherein amendments to some of the registers made by the interrupt routine 502 may be appropriately taken into account.

Thus, although the operating system of the computer system 300 and, in particular, the interrupt routine 502 are not adapted to save and restore the contents of each of the registers 302-307, 322-325, 332-335 and the running status bits 330, 340 of the processors 301, 321, 331, the contents of the registers 302-307, 322-325, 332-335 and the running status bits 330, 340 are restored after the execution of the interrupt routine 502. Moreover, the interrupt routine 502 may be executed in the serial mode of operation of the computer system 300. Therefore, no adaptations of the operating system to the parallel mode of operation of the computer system 300 are required. Thus, the computer system 300 according to the present disclosure provides a high degree of compatibility with software created for existing computer systems which do not support the presence of the slave processors 321, 331.

In some embodiments, the computer system 300 may further comprise a first mode switching instruction for switching the computer system 300 from the parallel mode of operation to the serial mode of operation. The system may be adapted to perform the steps of saving the contents of at least a portion of the registers 302-307, 322-325, 332-335 of the master processor 301 and the slave processors 321, 331 to the buffer memory 313 and to switch the system to the serial mode of operation when the first mode switching instruction is called. If the first mode switching instruction is executed by one of the slave processors 321, 331, the computer system 300 may additionally be configured to write the contents of at least one of the registers 322-325 or 332-335, respectively, of the slave processor 321 or the slave processor 331, respectively, wherein the first mode switching instruction is executed, to at least one of the registers 302-307 of the master processor 301.

In some embodiments, the computer system 300 may be configured to perform the following steps when executing the first mode switching instruction. The computer system 300 may check whether the indicator bit 308 is set to a value indicating that the computer system 300 is in the parallel mode of operation or not. If the indicator bit 308 indicates that the computer system 300 is in the serial mode of operation, an illegal instruction fault is generated and no further actions are performed. Further actions performed by the computer system 300 may depend on whether the first mode switching instruction is executed by the master processor 301 or by one of the slave processors 321, 331.

If the first mode switching instruction is executed by the master processor 301, the computer system 300 may stop instruction execution in the slave processors 321, 331. After the execution of instructions in each of the slave processors 321, 331 has stopped, the contents of the registers 322-325, 332-335 of the slave processors 321, 331 and, optionally, the running status bits 330, 340 of the slave processors 321, 331 may be written to the buffer memory 313, the address of which may be read from one of the second subset 306, 307 of the registers 302-307 of the master processor 301, for example from the register 306. Additionally, an identification number of the master processor 301, which may, in some embodiments, be the number zero, may be written to the buffer memory 313.

Subsequently, contents of the one of the second subset 306, 307 of the registers 302-307 of the master processor 301 comprising the address of the buffer memory 313, for example the content of the register 306, may be swapped with the contents of one of the first subset 302-305 of the registers 302-307 of the master processor 301, for example with the contents of the register 305. As explained above, the operating system running on the computer system 300 may be configured to handle the first subset 302-305 of the registers of the master processor 301 in case of an interrupt or exception. Hence, swapping the contents of the registers 305, 306 may help to insure that the address of the buffer memory 313 is saved and restored by the operating system in case of an interrupt or exception.

Thereafter, the computer system may save the contents of the second subset 306, 307 of the master processor 301 to the buffer memory 313. As explained above, one of the second subset 306, 307 of the registers 302-307, for example the register 307, may comprise the address of the trampoline instruction. Hence, the address of the trampoline instruction may be saved to the buffer memory 313 when saving the contents of the registers 306, 307. Subsequently, the computer system 300 may set the indicator bit 308 to a value indicating that the computer system is in the second mode of operation, for example to the value "OFF."

If the first mode switching instruction is executed by one of the slave processors 321, 331, the computer system 300 may stop the execution of instructions in the master processor 301 as well as in the slave processors 321, 331. After the execution of instructions has stopped in all processors 302, 321, 331, the contents of the registers 302-307 of the master processor 301 may be saved to the buffer memory 313, the address of which may be read from one of the second subset 306, 307 of the registers 302-307 of the master processor 301, for example from the register 306. Additionally, the contents of the registers 322-325, 332-335 of the slave processors 321, 331, and, optionally, the values of the running status bits 330, 340 of the slave processors 321, 331 may be saved to the buffer memory 313.

In some embodiments, the contents of the slave processor 321, 331 wherein the first mode switching instruction is performed need not be saved to the buffer memory. In such embodiments, only the contents of the registers of the other slave processors are saved to the buffer memory 313. Hence, if the first mode switching instruction is executed by the first slave processor 321, the contents of the registers 332-335 of the second slave processor 331 and, optionally, contents of registers of further slave processors provided in the computer system 300, in addition to the slave processors 321, 331, are saved to the buffer memory 313. Conversely, if the first mode switching instruction is executed by the second slave processor 331, the system may save the contents of the registers 322-325 of the first slave processor 321 to the buffer memory 313. In such embodiments, however, the values of each of the running status bits 330, 340 may be saved to the buffer memory 313.

Thereafter, the contents of the register of the master processor 301 comprising the address of the buffer memory, for example the contents of the register 306, may be saved to a temporary register which may, in some embodiments, be provided in the buffer memory 313. Furthermore, an identification number of the processor wherein the first mode switching instruction is executed may be saved to the buffer memory 313. For example, in case the first mode switching instruction is executed by the first slave processor 321, the computer system 300 may save an identification number 1 to the buffer memory 313. If the first mode switching instruction is executed by the second slave processor 331, the computer system 300 may save an identification number 2 to the buffer memory 313. In other embodiments, different identification numbers may be used.

Subsequently, the contents of the registers 322-325 or 332-335, respectively, of the slave processor 321 or 331, respectively, executing the first mode switching instruction may be written to the first subset 302-305 of the registers 302-307 of the master processor 301. In some embodiments, contents of some or all of the second subset 306, 307 of the registers 302-307 of the master processor 301 may be overwritten while writing the contents of the registers 322-325 or 332-335 to the first subset 302-305 of registers.

Then, the computer system 300 may save the contents of one of the first subset of the registers 302-305 of the master processor 301, for example the contents of the register 305, to the buffer memory 313. Subsequently, the contents of the temporary buffer may be written to the register 305. Hence, the address of the buffer memory 313 is stored in a register, the contents of which is handled by the operating system in case of an interrupt or exception. Thereafter, the indicator bit 308 may be set to a value indicating that the computer system 300 is in the first mode of operation, for example to the value "OFF" to switch the computer system 300 to the serial mode of operation.

In some embodiments, the computer system 300 may be configured to perform the above-described steps as an atomic interruption in order to avoid problems resulting from an interrupt or exception occurring during the execution of the first mode switching instruction.

After executing the first mode switching instruction, the computer system may carry out one or more instructions in the serial mode of operation. The computer system 300 may remain in the serial mode of operation until the enabling instruction described above, or the second mode switching instruction, which will be explained in more detail below, is executed. For example, the computer system 300 may execute a call of the operating system of the computer system 300.

The computer system 300 may further comprise a second mode switching instruction adapted to switch the computer system 300 from the serial mode of operation to the parallel mode of operation and to read the contents of some or all of the registers 302-307, 322-325, 332-335 of the processors 301, 321, 331 and, optionally, values of the running status bits 330, 340 of the slave processors 321, 331 from the buffer memory 313. If a preceding execution of the first mode switching instruction was performed by one of the slave processors 321, 331, the computer system 300 may additionally write the contents of at least one of the registers 302-307 of the master processor 301 to the slave processor 321, 331 which executed the first mode switching instruction.

In some embodiments, the computer system 300 may be configured to perform the following steps when executing the second mode switching instruction. First, the computer system 300 may check the control register bit 309. If the value of the control register bit 309 indicates that the parallel mode of operation of the computer system 300 is not allowed, an illegal instruction fault is generated and no further actions are performed. Otherwise, the computer system 300 may read an indication number indicating the processor which executed the first mode switching instruction previously. Further steps performed by the computer system 300 may depend on whether the first mode switching instruction was executed by the master processor 301 or by one of the slave processors 321, 331.

If the first mode switching instruction was executed by the master processor 301, which may, in some embodiments, be indicated by a value of zero of the indicator number, the computer system 300 may read the contents of the registers 322-325, 332-335 of the slave processors 321, 331 and, optionally, values of the running status bits 330, 340 from the buffer memory 313. Additionally, the computer system 300 may read contents of the second subset 306, 307 of the registers 302-307 of the master processor 301 from the buffer memory. Subsequently, the contents of the one of the first subset 302-305 of the registers 302-307 of the master processor 301 comprising the address of the buffer memory and the contents of one of the second subset 306, 307 of registers may be swapped in order to store the address of the buffer memory 313 in the second subset 306, 307 of registers. In some embodiments, the contents of the registers 305, 306 may be swapped.

Thereafter, the computer system 300 may set the indicator bit 308 to a value indicating that the computer system 300 is in the parallel mode of operation. In some embodiments, the indicator bit 308 can be set to the value "OFF." Then, the execution of instructions may be resumed in the master processor 301 and in any of the slave processors 321, 331 wherein the value of the running status bit 330, 340 indicates that the respective slave processor 321, 331 was executing instructions before the first mode switching instruction was performed.

If the previous execution of the first mode switching instruction was performed by one of the slave processors, which may be indicated by a value of the indicator number greater than zero, the contents of the registers 322-325, 332-335 of the slave processors 321, 331 as well as the values of the running status bits 330, 340 may be read from the buffer memory 313, whose address may be read from one of the first subset 302-305 of the master processor 301, for example from the register 305. In some embodiments, only the contents of the registers of those slave processors 321, 331 which did not perform the preceding execution of the first mode switching instruction need to be read from the buffer memory 313. Additionally, the computer system 300 may read the contents of the second subset 306, 307 of the registers 302-307 of the master processor 301 from the buffer memory 313.

Then, the contents of the register comprising the address of the buffer memory 313, which may in some embodiments be the register 305, may be written to a temporary register which may be provided in the buffer memory 313, and the contents of the register 305 may be read from the buffer memory 313. Thereafter, the contents of the first subset 302-305 of the registers 302-307 of the master processor 301 may be written to registers of the slave processor 321, 331 wherein the preceding execution of the first mode switching instruction was executed. Thus, the registers of the slave processor 321, 331 may comprise amendments of the registers of the master processor 301 which were made while the computer system 300 was operating in the serial mode of operation. Hence, execution of a thread running on the master processor 301 during the serial mode of operation may more easily be continued on the slave processor. For example, the first subset 302-305 of the registers 302-307 of the master processor 301 may comprise exception information about an interrupt or exception occurring while the computer system 300 was operating in the serial mode of operation which may be considered by the slave processor 321, 331 when the computer system 300 is in the parallel mode of operation.

Subsequently, the contents of the first subset 302-205 of the registers 302-307 of the master processor 301 may be read from the buffer memory 313 and the indicator bit 308 may be set to a value indicating that the computer system 300 is in the parallel mode of operation, and the execution of instructions may be resumed in the master processor 301 and in those of the slave processors 321, 331 wherein the value of the respective running status bit 330, 340 indicates that instructions were executed in the respective slave processor 321, 331 when the first mode switching instruction was called to switch the computer system 300 to the serial mode of operation.

In some embodiments, the computer system 300 may be configured to execute the above-described steps of the second mode switching instruction as an atomic operation to avoid problems resulting from an interrupt or exception occurring during the execution of the second mode switching instruction.

The first mode switching instruction and the second mode switching instruction may be employed in order to implement a program which may switch the computer system 300 between the parallel and the serial mode of operation. If the first mode switching instruction is executed, the further execution of the program will be performed in the serial mode of operation until either the enabling instruction or the second mode switching instruction is executed. A program using the first mode switching instruction and/or the second mode switching instruction may comprise further instructions to store the contents of the register 305 or another of the registers 302-307 of the master processor wherein the address of the buffer memory 313 is stored in the system memory 304 after the execution of the first mode switching instruction and to read the contents of the register 305 from the system memory 304 before the execution of the second mode switching instruction. This may be done by means of standard store and load instructions of the serial mode of operation of the computer system 300. After storing the contents of the register 305 in the system memory, the program may use each of the first subset 302-305 of the registers 302-307 of the master processor 301. Alternatively, the address of the memory buffer 313 may be stored in a variable from which it may be loaded into the register 305 before executing the first and/or the second mode switching instruction.

The above-described functionality and instructions of the computer system 300 may be provided by means of specialized circuitry provided in the master processor 301 and the slave processors 321, 331, or by means of microcode provided in the master processor 301 and the slave processors 321, 331.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system, comprising:
    a master processor comprising first storage operable to maintain a first plurality of variables defining a state of the master processor, the first plurality of variables comprising a first return address;
    a slave processor comprising second storage operable to maintain a second plurality of variables defining a state of the slave processor, the second plurality of variables comprising a second return address; and
    a buffer memory,
    wherein the system is configured to perform, responsive to an interrupt or exception occurring in a parallel mode of operation wherein data are processed by the master processor and the slave processor, the steps of:
        saving at least a portion of the first plurality of variables and the second plurality of variables to the buffer memory and switching the system to a serial mode of operation wherein data are processed by the master processor;
        responsive to the interrupt or exception occurring in the slave processor, setting at least one of the first plurality of variables in the first storage to a value of at least one of the second plurality of variables in the second storage; and
        responsive to the interrupt or exception occurring in the master processor, saving the first return address and the second plurality of variables to the buffer memory and replacing the first return address with an address of a trampoline instruction and executing the trampoline instruction to perform the steps of switching the system to the parallel mode of operation and reading the second plurality of variables and the first return address from the buffer memory.

2. The system of claim 1, wherein the system is further configured to perform the steps of, responsive to the interrupt or exception occurring in the slave processor, saving the first plurality of variables and the second plurality of variables to the buffer memory, replacing the first return address with the address of the trampoline instruction, switching to the serial mode of operation, and executing the trampoline instruction to perform the steps of switching the system to the parallel mode of operation, reading the second plurality of variables from the buffer memory, setting the at least one of the second plurality of variables to a value of the at least one of the first plurality of variables, and reading the first plurality of variables from the buffer memory.

3. The system of claim 1, wherein the system is operable to execute an enabling instruction for enabling the parallel mode of operation, the enabling instruction being adapted to set a first of the first plurality of variables to an address of the buffer memory, set a second of the first plurality of variables to an address of the trampoline instruction, and switch the processor into the parallel mode of operation.

4. The system of claim 1, wherein the system is operable to execute a variable sending instruction adapted to write values of one or more of the first plurality of variables in the first storage to one or more of the second plurality of variables in the second storage.

5. The system of claim 1, wherein the system is operable to execute a variable receiving instruction adapted to write values of one or more of the second plurality of variables in the second storage to one or more of the first plurality of variables in the first storage.

6. The system of claim 1, wherein the system is operable to execute a fork instruction adapted to initiate instruction execution by the at least one slave processor, the instruction execution starting at a specified memory address.

7. The system of claim 1, wherein the system is operable to execute a slave join instruction adapted to stop instruction execution by the at least one slave processor.

8. The system of claim 7, wherein the system is operable to execute a master join instruction adapted to keep the master processor waiting until instruction execution at the at least one slave processor has terminated.

9. The system of claim 1, wherein the system is operable to execute an end instruction adapted to switch the system from the parallel mode of operation to the serial mode of operation.

10. A method of operating a system including a master processor comprising first storage operable to maintain a first plurality of variables defining a state of the master processor, the first plurality of variables comprising a first return address, a slave processor comprising second storage operable to maintain a second plurality of variables defining a state of the slave processor, the second plurality of variables comprising a second return address, and a buffer memory, the method comprising:
responsive to an interrupt or exception occurring in a parallel mode of operation wherein data are processed by the master processor and the slave processor, saving at least a portion of the first plurality of variables and the second plurality of variables to the buffer memory and switching the system to a serial mode of operation wherein data are processed by the master processor;
responsive to the interrupt or exception occurring in the slave processor, setting at least one of the first plurality of variables in the first storage to a value of at least one of the second plurality of variables in the second storage; and
responsive to the interrupt or exception occurring in the master processor, saving the first return address and the second plurality of variables to the buffer memory and replacing the first return address with an address of a trampoline instruction and executing the trampoline instruction to switch the system to the parallel mode of operation and read the second plurality of variables and the first return address from the buffer memory.

11. The method of claim 10, further comprising, responsive to the interrupt or exception occurring in the slave processor, saving the first plurality of variables and the second plurality of variables to the buffer memory, replacing the first return address with the address of the trampoline instruction and switching to the serial mode of operation, and executing the trampoline instruction to switch the system to the parallel mode of operation, read the second plurality of variables from the buffer memory, set the at least one of the second plurality of variables to a value of the at least one of the first plurality of variables, and read the first plurality of variables.

12. The method of claim 10, further comprising executing an enabling instruction for enabling the parallel mode of operation, the enabling instruction being adapted to set a first of the first plurality of variables to an address of the buffer memory, set a second of the first plurality of variables to an address of the trampoline instruction, and switch the processor into the parallel mode of operation.

13. The method of claim 10, further comprising executing a variable sending instruction adapted to write values of one or more of the first plurality of variables in the first storage to one or more of the second plurality of variables in the second storage.

14. The method of claim 10, further comprising executing a variable receiving instruction adapted to write values of one or more of the second plurality of variables in the second storage to one or more of the first plurality of variables in the first storage.

15. The method of claim 10, further comprising executing a fork instruction adapted to initiate instruction execution by the at least one slave processor, the instruction execution staffing at a specified memory address.

16. The method of claim 10, further comprising executing a slave join instruction adapted to stop instruction execution by the at least one slave processor.

17. The method of claim 16, further comprising executing a master join instruction adapted to keep the master processor waiting until instruction execution at the at least one slave processor has terminated.

18. The method of claim 10, further comprising executing an end instruction adapted to switch the system from the parallel mode of operation to the serial mode of operation.

19. A system, comprising:
a master processor comprising first storage operable to maintain a first plurality of variables defining a state of the master processor, the first plurality of variables comprising a first return address;
a slave processor comprising second storage operable to maintain a second plurality of variables defining a state of the slave processor, the second plurality of variables comprising a second return address;
a buffer memory;
first means for, responsive to an interrupt or exception occurring in a parallel mode of operation wherein data are processed by the master processor and the slave processor, saving at least a portion of the first plurality of variables and the second plurality of variables to the buffer memory and switching the system to a serial mode of operation wherein data are processed by the master processor;
second means for, responsive to the interrupt or exception occurring in the slave processor, setting at least one of the first plurality of variables in the first storage to a value of at least one of the second plurality of variables in the second storage; and
third means for, responsive to the interrupt or exception occurring in the master processor, saving the first return address and the second plurality of variables to the buffer memory and replacing the first return address with an address of a trampoline instruction and executing the trampoline instruction to perform the steps of switching the system to the parallel mode of operation and reading the second plurality of variables and the first return address from the buffer memory.

20. The system of claim 19, further comprising fourth means for, responsive to the interrupt or exception occurring in the slave processor, saving the first plurality of variables and the second plurality of variables to the buffer memory, replacing the first return address with the address of the trampoline instruction, switching to the serial mode of operation, and executing the trampoline instruction to perform the steps of switching the system to the parallel mode of operation, reading the second plurality of variables from the buffer memory, setting the at least one of the second plurality of variables to a value of the at least one of the first plurality of variables, and reading the first plurality of variables from the buffer memory.

21. The system of claim 19, wherein the first, second, and third means comprise circuitry disposed in at least one of the master processor or the slave processor.

22. The system of claim 19, wherein the first, second, and third means comprise microcode disposed in third storage on at least one of the master processor or the slave processor.

* * * * *

UNITED STATES PATENT AND TRADEMARK OFFICE
CERTIFICATE OF CORRECTION

| | | |
|---|---|---|
| PATENT NO. | : 7,689,809 B2 | Page 1 of 1 |
| APPLICATION NO. | : 12/014868 | |
| DATED | : March 30, 2010 | |
| INVENTOR(S) | : Uwe Kranich | |

It is certified that error appears in the above-identified patent and that said Letters Patent is hereby corrected as shown below:

Col. 30, line 4 (claim 15, line 4), delete "staffing" and insert therefor -- starting --.

Signed and Sealed this

Eleventh Day of May, 2010

David J. Kappos
*Director of the United States Patent and Trademark Office*